Oct. 13, 1942.  R. B. COTTRELL  2,299,051
CUSHION DEVICE FOR PEDESTAL TYPE TRUCKS
Filed Dec. 8, 1939  3 Sheets-Sheet 1
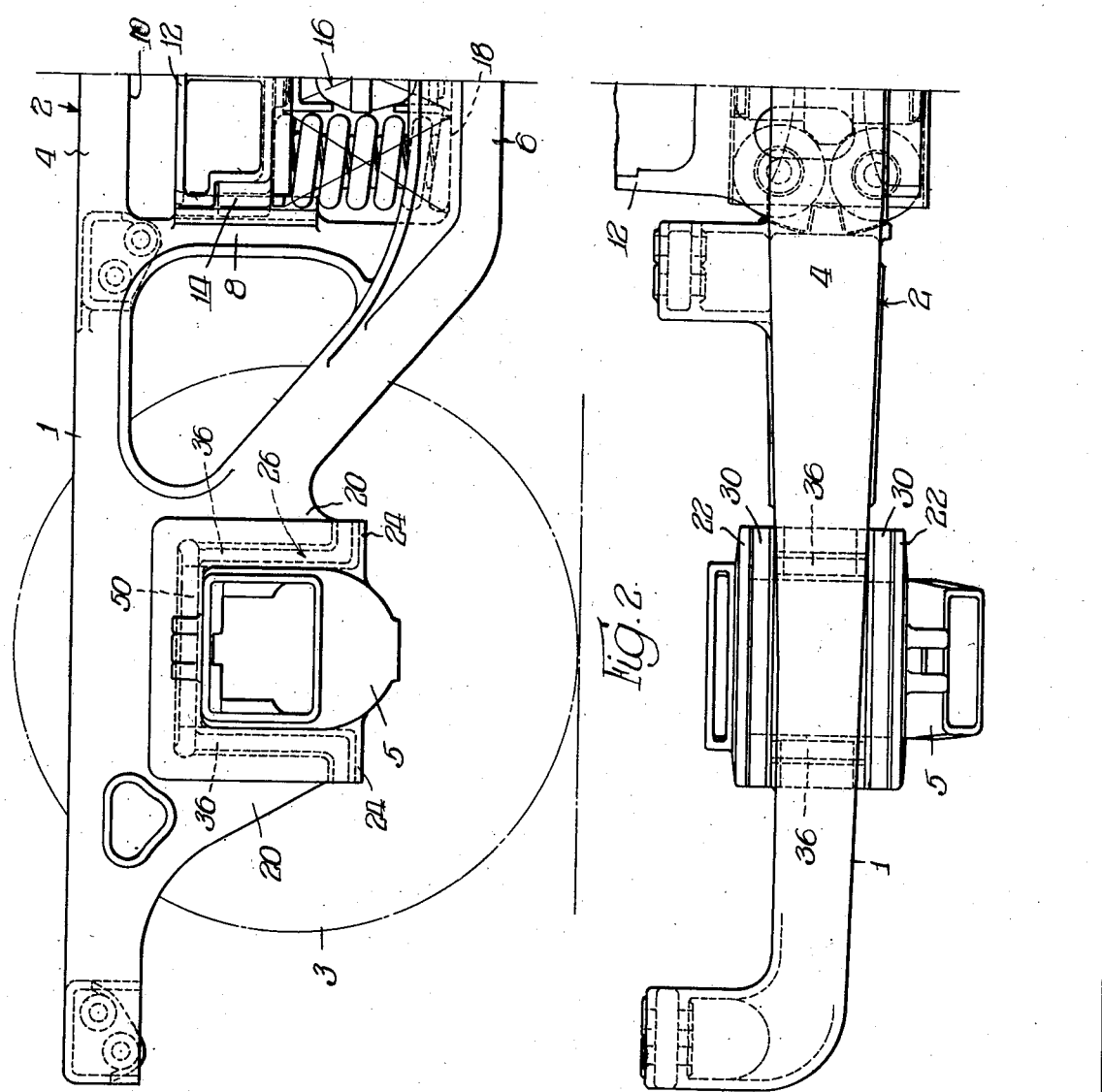
INVENTOR.
Robert B Cottrell,
BY
ATTORNEY.

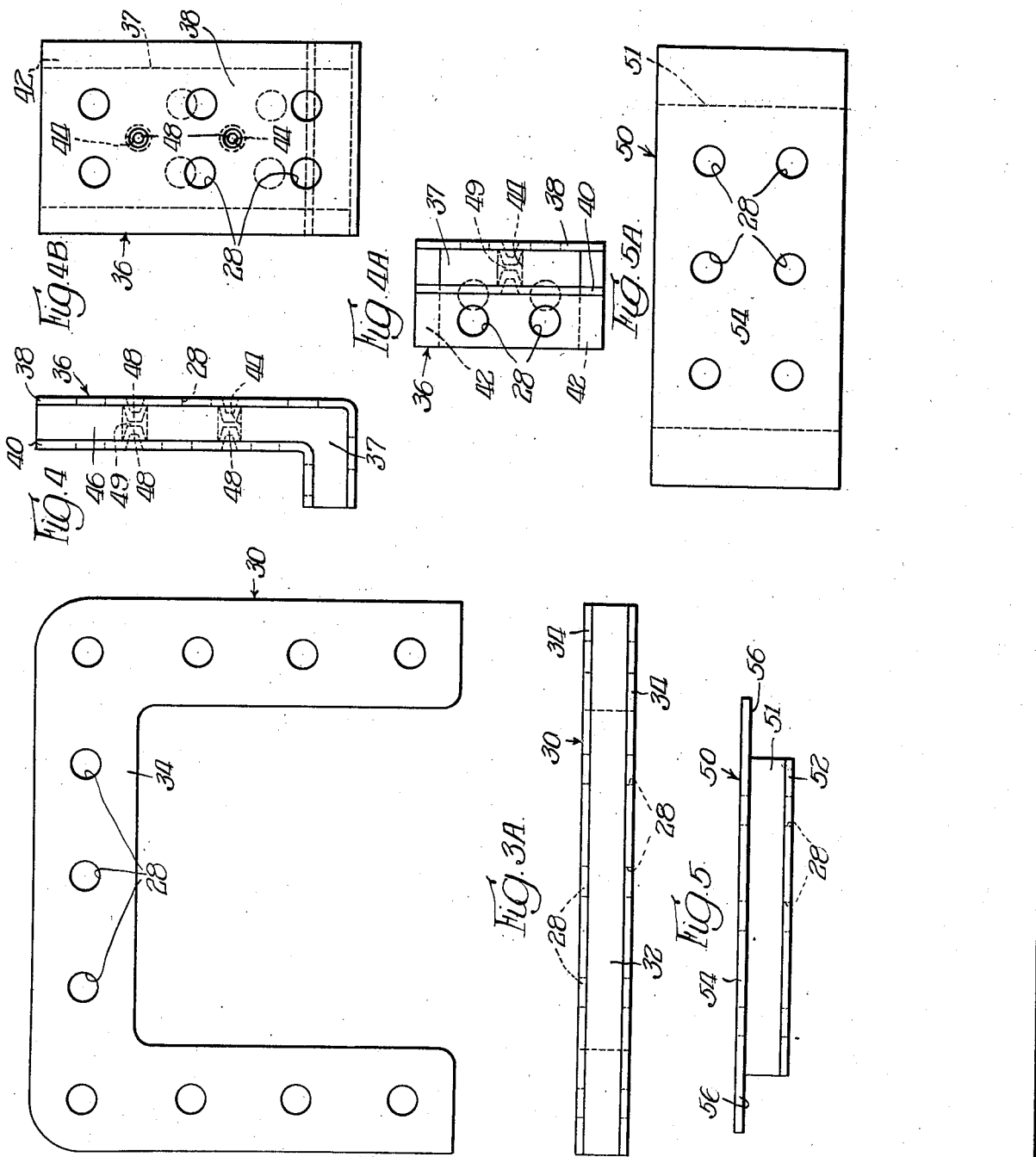

Oct. 13, 1942.   R. B. COTTRELL   2,299,051
CUSHION DEVICE FOR PEDESTAL TYPE TRUCKS
Filed Dec. 8, 1939   3 Sheets-Sheet 3
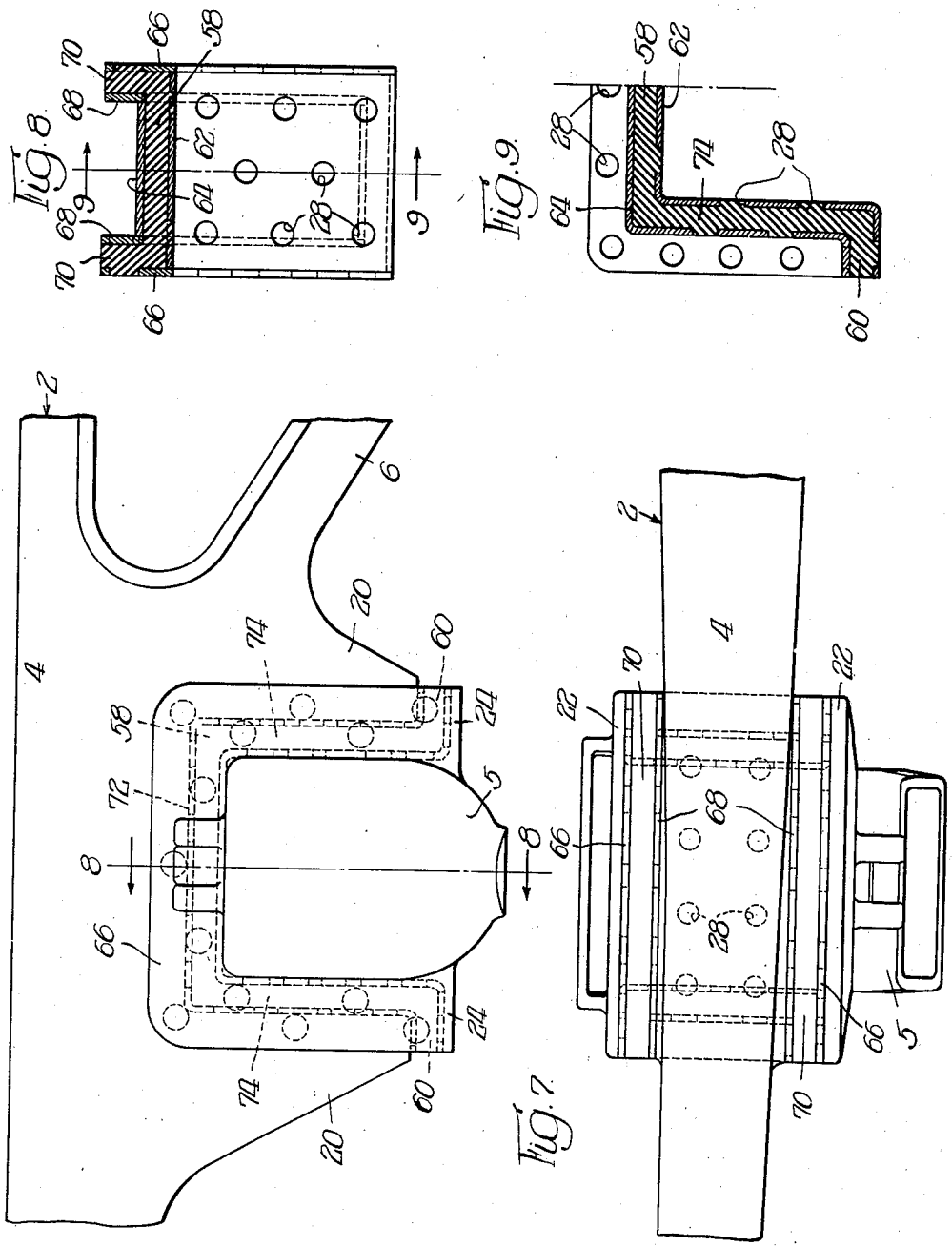
INVENTOR.
Robert B. Cottrell,
BY
ATTORNEY.

Patented Oct. 13, 1942

2,299,051

UNITED STATES PATENT OFFICE 2,299,051

CUSHION DEVICE FOR PEDESTAL TYPE TRUCKS

Robert B. Cottrell, Chicago, Ill., assignor to American Steel Foundries, Chicago, Ill., a corporation of New Jersey Application December 8, 1939, Serial No. 308,122

16 Claims. (Cl. 105—224.1)

My invention relates to car trucks and more particularly to cushioning means for a pedestal type truck whereby transmission to the side frame of shocks and vibrations caused by axial reactions is reduced to a minimum.

An object of my invention is to provide cushioning means for a journal box connection to a side frame of the pedestal type.

Another object of my invention is to design a quick wheel change car truck of pedestal type having cushioning means between the side frame and the journal box whereby additional vertical movement of a car body with respect to its supporting wheel and axle assembly may be afforded.

Another object of my invention is to provide a pedestal type car truck with cushioning means providing a certain amount of vertical and lateral motion between the journal boxes and the side frame.

Another object of my invention is to design a car truck with a minimum of unsprung weight and in which relative lateral movement of the side frame and journal members is cushioned at the most desirable places, that is, the journal boxes.

A further object of my invention is to design a car truck of the pedestal jaw type having cushioning means between the journal boxes and the pedestal jaws of such arrangement and construction that wear plates may be eliminated.

Another object of my invention is to apply resilient means between the journal boxes and pedestal jaws of a truck to prevent the transmission of rail and wheel noises to the car body.

A still further object of my invention is to provide cushioning means for a pedestal type car truck of such construction and arrangement that machining of the side frames and the journal boxes for their application may be eliminated.

A further object of my invention is to design cushioning means for a car truck of the pedestal jaw type wherein resilient material of different characteristics may be placed around the journal box in order to provide the best and most efficient combination.

A further object of my invention is to provide cushioning means for a quick wheel change truck of the pedestal jaw type whereby a considerable quantity of resilient material may be used between the pedestal connection to the journal boxes to absorb shocks and vibrations.

Another object of my invention is to provide cushioning means for a pedestal type car truck of the above type wherein stop means are provided for limiting the longitudinal travel of the journal box and wheels.

Referring to the drawings, Figure 1 is a fragmentary side elevation of a car truck embodying my invention;

Figure 2 is a top plan view of the structure shown in Figure 1;

Figure 3 is a side elevation of one of the metal-faced rubber pads used in my device, and Figure 3A is a top plan view thereof;

Figure 4 is a side elevation of a metal-faced rubber pad to be seated against the side wall of a journal box; Figure 4A is a top plan view thereof, and Figure 4B is an end view of said pad;

Figure 5 is a side view of the metal-faced rubber pad used on the top of the journal box, and Figure 5A is a top plan view thereof;

Figure 6 is a fragmentary side elevation of the car truck indicated in Figure 1 showing a modification of my novel cushioning means;

Figure 7 is a top plan view of the structure shown in Figure 6;

Figure 8 is a sectional view taken substantially in the vertical transverse plane indicated by the line 8—8 of Figure 6; and Figure 9 is a sectional view taken substantially in the longitudinal vertical plane indicated by the line 9—9 of Figure 8.

Describing my device in greater detail, the truck frame generally indicated at 1 may be of the quick wheel change type fully described in my United States Letters Patent No. 2,188,641 granted January 30, 1940, entitled Spring Plankless Truck. It is to be understood, of course, that my novel cushioning means hereinafter described may be adapted to any frame having pedestal jaws for receiving a journal member. The said truck frame may be supported at each end in the usual manner by a wheel and axle assembly 3 through the journal box 5 and my novel cushioning means hereinafter more fully described. Each side frame 2 comprises a top member 4, a bottom member 6 and spaced columns 8, 8 integral therewith defining with said members a bolster opening 10 within which a bolster 12 may be received. The end of said bolster engages with said side frame in a manner fully described in my said patent and may seat upon a spring cap or insert 14 positioned on the top of a spring arrangement 16, said spring arrangement having a seat as at 18 on said bottom member 6. The said top and bottom members merge adjacent their ends to form pedestal jaws 20, 20 serving as guide means for said journal box 5. The said jaws depend downwardly from the top member 4 presenting an inverted U-shaped opening therebetween to receive said journal box.

The said journal box 5 may be of conventional box-like form serving to house axle bearings (not shown). Adjacent opposite ends of said box, spaced vertical flanges 22, 22 may project outwardly from its side walls and upwardly from its top wall. Outwardly projecting horizontal flanges 24, 24 connect said vertical flanges adjacent the bottom wall of said box and serve with the top wall of said box as seating means for my novel cushioning device.

My novel cushioning means generally indicated at 26 is interposed between said side frame and journal box and may be seated between said vertical flanges 22, 22 on the seating means aforedescribed. The said cushioning means is of substantially U-shape form as assembled and affords resilient resistance to any relative movement of said frame and said journal box.

In the modification shown in Figures 1 to 6, my novel cushioning means comprises a plurality of resilient pads faced on opposite sides with metal plates secured thereto in any convenient manner, as by vulcanizing, and including a plurality of perforations 28, 28 within which resilient material may be secured in the vulcanizing process. Details of said resilient pads are shown in Figures 3 to 6.

The pads 30, 30 abutting the inboard and outboard sides of the frame may be of substantially U-shape and each comprises a pad 32 of resilient material faced on opposite sides with metal plates 34, 34.

Each pad 36, 36 abuts or faces a pedestal 20 and comprises a pad 37 of resilient material of substantially L-shape faced with metal plates 38 and 40 on opposite sides thereof, said plates extending slightly beyond said resilient material on opposites sides thereof as at 42, 42 to permit flowing of said material when under load. Spaced openings 44, 44 centrally formed in the vertical arm 46 of said L-shaped side pad may receive the spaced bosses 48, 48 projecting from the inner faces of plates 38 and 40. The said bosses are aligned for abutment against each other as at 49 (Figures 4 and 4A) and afford stop means for limiting the compression of said resilient material and thereby the relative longitudinal movement of said box and said frame.

The top pad 50 comprises a pad 51 of resilient material of rectangular shape having a bottom plate 52 and a top plate 54 secured as already described to its opposite faces, said top plate extending slightly beyond said resilient material at opposite ends thereof as at 56, 56. It is to be understood, of course, that the resilient material in each of the aforedescribed pads may have different characteristics depending upon the amount and direction of the load to be taken.

To assemble my novel cushioning device, the pads 30, 30 may be placed on the journal box adjacent the vertical flanges 22, 22. The pads 36, 36 may be inserted between said pads 30, 30 and seated on the horizontal flanges 24, 24 (Figure 1). The top pad 50 may be placed on the top wall of said journal box between said pads 30, 30. The pedestal jaws of the side frame may then be lowered over the journal box and seated upon my cushioning device.

In operation, vertical loading may be taken as by compression in said top pad 51 and the horizontal portion of each pad 37 and as by shear in the vertical portions 46, 46 thereof. Lateral or transverse loads may be taken by a compression in the pads 32, 32. Forces acting in a longitudinal direction may be taken as by compression in the vertical portions 46, 46 of said pads 37, 37 and relative longitudinal movement of said journal box and said side frame may be limited by the stop means 49, 49 as above described. It will thus be apparent that relative movement of said side frame and said journal box in any direction will be cushioned by my novel cushioning device.

In the modification shown in Figures 6 to 9, the pedestal cushioning device is formed as a single unit instead of in a plurality of pieces as in the modification first described. The modification now under consideration comprises a single resilient pad 58 of channel section of substantially U-shape with transverse horizontal flanges 60, 60 for seating on said horizontal flanges 24, 24. A metal plate 62 is secured along the bottom and the inner surface of the pad 58 conforming to the shape thereof, and a plate 64 is secured to the top and outer surface of the pad 58 likewise conforming to the shape thereof. Plates 66, 66 are secured at the outer edges of the pad 58 and the plates 68, 68 along the inner surfaces of the vertical portions indicated at 70, 70 (Figure 8). This modification of my novel cushioning device provides a single metal-faced resilient pad of substantially U-shape which may be seated on said journal box as a unit.

In operation, said unit serves to take vertical loading as by compression in the horizontal portions 58 and 60, 60 and by shear in the vertical side portions 74, 74. Transverse loading may be taken as by compression in the vertical portions 70, 70 and longitudinal loading may be taken as by compression in the vertical side portions 74, 74.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a car truck, a frame having pedestal jaws forming a journal opening, a supporting wheel and axle assembly having a journal box in said opening, inboard and outboard flanges around said box merging with horizontal flanges adjacent the base thereof and enclosing the edges of said opening, and cushioning means between said frame and said box comprising U-shaped resilient pads confined between said frame and said inboard and outboard flanges, substantially L-shaped resilient pads seated on said horizontal flanges, and a resilient pad seated on the top of said box, said pads comprising metal plates abutting said frame and said box.

2. In a car truck, a side frame having pedestal legs, a journal box received between said legs, resilient means interposed between said journal box and said frame for cushioning relative vertical and lateral movements of said box and said frame, said means comprising metal-faced resilient pads, and seating and retaining means for said pads on said box, said seating and retaining means comprising horizontal flanges adjacent the bottom of said box and at opposite sides thereof, inboard and outboard vertical flanges around said box merging with said horizontal flanges to form channels around said box, and horizontal seats for said frame on said resilient means atop said box and at opposite sides thereof.

3. In a car truck, a side frame having depending pedestal legs, a journal box received between said legs, inboard and outboard flanges around said box merging with horizontal flanges adjacent the base thereof, cushioning means between said box and said frame comprising U-shaped resilient pads confined between said frame and said flanges, substantially L-shaped resilient pads seated on said horizontal flanges, and a resilient pad seated on the top of said journal box, said pads comprising metal plates abutting said frame and said box and affording resilient movement therebetween vertically, longitudinally, and laterally of said truck.

4. In a car truck, a side frame having pedestal jaws forming a journal opening, a supporting wheel and axle assembly having a journal member in said opening, resilient means interposed between said member and said frame comprising a plurality of pads of different resiliency faced on opposite sides with metal plates and compressible therebetween, certain of said metal plates extending beyond said resilient pads to permit flowing of said pads when under load, and retaining flanges on said member overlapping vertical and horizontal edges of said opening and confining said resilient means.

5. In a car truck, a side frame having pedestal jaws forming a journal opening, a journal box received in said opening, and means at three spaced horizontal areas for cushioning vertical loads from said frame to said box, said means comprising resilient pads interposed between said box and said frame, one of said pads being seated on top of said box and other of said pads of substantially L-shape being supported from seating means adjacent the base of said box, said seating means comprising integral horizontal flanges at opposite sides of said box, the horizontal legs of said L-shaped pads being interposed between said horizontal flanges and the bottom of said jaws.

6. In a car truck, a side frame having pedestal jaws forming a journal opening, a journal box received in said opening, resilient means for cushioning relative lateral movement of said frame and said journal box comprising U-shaped resilient pads adjacent inboard and outboard edges of said journal box, and means for retaining said pads on said box, said retaining means comprising inboard and outboard vertical flanges around said box merging with horizontal flanges adjacent the base thereof and enclosing the edges of said opening.

7. In a car truck, a side frame having pedestal legs defining a journal opening, a supporting wheel and axle assembly having a journal member in said opening, seating and retaining flanges on said member embracing all edges of said opening, resilient means interposed between said member, said flanges, and said frame comprising a plurality of L-shaped resilient pads of different resilient characteristics faced on opposite sides with metal plates and affording horizontal seats for said legs, and stop means on certain of said pads for limiting relative longitudinal movement of said member and said frame, said stop means including spaced bosses integral with said plates and opposed for abutment against each other.

8. In a car truck, a side frame having pedestal jaws forming a journal opening, a journal box in said opening having integral flanges enclosing the edges of said opening, and cushioning means compressible between said frame and said box comprising U-shaped resilient pads confined between said frame and said flanges, and substantially L-shaped resilient pads seated on horizontal portions of said flanges, said pads comprising metal plates abutting said frame and said box and affording resilient resistance to relative movement of said box and said frame.

9. In a car truck, a side frame having pedestal jaws forming a journal opening, a supporting wheel and axle assembly having a journal member in said opening, vertical and horizontal retaining means on said member overlapping all edges of said opening, resilient means interposed between said member, said retaining means, and said frame comprising a plurality of resilient pads faced on opposite sides with metal plates, certain of said metal plates extending beyond said resilient pads to permit flowing of said pads when under load, and stop means on certain of said pads for limiting relative longitudinal movement of said member and said frame.

10. In a car truck, a side frame having pedestal legs, a journal box received between said legs, vertical and horizontal flanges on said box overlapping vertical and horizontal edges of said legs, and resilient means comprising pads of resilient material having metal plates secured to their opposite faces and arranged to cushion relative vertical, transverse and longitudinal movements of said box and said frame on a plurality of spaced areas in each direction, said resilient means being compressed between said box, said flanges, and said legs.

11. In a car truck, a side frame having pedestal legs, a journal box received between said legs and having vertical and horizontal flanges accommodating said pedestal legs, resilient means including metal-faced resilient pads interposed between said journal box, said flanges, and said legs for cushioning relative vertical and lateral movements of said box and said frame on a plurality of spaced areas in each direction.

12. In a car truck, a side frame having pedestal jaws forming a journal opening, a supporting wheel and axle assembly having a journal box received in said opening, vertical and horizontal flanges on said box enclosing all marginal areas of said opening, resilient means between said box, said flanges, and said frame embracing the edges of said opening for cushioning relative movement of said box and said frame, certain portions of said resilient means affording three spaced horizontal seats for said frame.

13. In a car truck, a side frame having pedestal legs defining a journal opening, a journal box received between said legs, inboard and outboard vertical flanges on said journal box merging with horizontal flanges adjacent the base thereof, and resilient means for cushioning relative lateral movement of said frame and said journal box comprising U-shaped metal-faced resilient pads fitted over said journal box between said flanges and said legs and substantially L-shaped resilient pads seated on said horizontal flanges and affording horizontal seats for said legs.

14. In a car truck, a side frame having pedestal jaws forming a journal opening, a journal box in said opening having integral vertical and horizontal flanges enclosing all vertical and horizontal edges of said opening, and cushioning means confined between said frame, said flanges, and said box comprising a plurality of pads of different resilient characteristics having metal plates abutting said frame and said box at spaced areas therearound.

15. In a car truck, a side frame having pedestal jaws forming a journal opening, a supporting wheel and axle assembly having a journal box received in said opening, resilient means interposed between said box and said frame and enclosing the edges of said opening, and seating and retaining means on said box for said resilient means comprising inboard and outboard vertical flanges merging with horizontal flanges adjacent the bottom wall of said box, said resilient means including horizontal portions compressed between said horizontal flanges and said jaws.

16. In a car truck, a side frame having pedestal jaws forming a journal opening, a journal box in said opening having integral flanges enclosing the edges of said opening, and resilient means compressible between said frame, said box, and said flanges, said resilient means having inboard and outboard U-shaped portions interposed between said frame and certain of said flanges, a horizontal portion between the top of said box and said frame, and substantially L-shaped portions seated on other of said flanges between said jaws and said box, said resilient means being faced with metal plates and affording resilient resistance to relative movement of said box and said frame.

ROBERT B. COTTRELL.